US011390401B2

(12) United States Patent
Sotero et al.

(10) Patent No.: US 11,390,401 B2
(45) Date of Patent: Jul. 19, 2022

(54) SELF-DRIVEN MODULAR SANDBAGGING DEVICE AND METHOD

(71) Applicants: Adalberto L Sotero, Miami, FL (US); Rosa L Cruz, Hialeah, FL (US)

(72) Inventors: Adalberto L Sotero, Miami, FL (US); Rosa L Cruz, Hialeah, FL (US)

(*) Notice: Subject to any disclaimer, the term of this patent is extended or adjusted under 35 U.S.C. 154(b) by 0 days.

(21) Appl. No.: 17/393,815

(22) Filed: Aug. 4, 2021

(65) Prior Publication Data

US 2022/0055779 A1  Feb. 24, 2022

Related U.S. Application Data

(60) Provisional application No. 63/068,355, filed on Aug. 20, 2020.

(51) Int. Cl.
| | | |
|---|---|---|
| *B65B 1/12* | (2006.01) | |
| *B62D 33/027* | (2006.01) | |
| *B60P 3/42* | (2006.01) | |
| *B60P 1/42* | (2006.01) | |

(52) U.S. Cl.
CPC ............. *B65B 1/12* (2013.01); *B60P 1/42* (2013.01); *B60P 3/42* (2013.01); *B62D 33/0273* (2013.01)

(58) Field of Classification Search
CPC .......... B60P 1/42; B60P 3/42; B62D 33/0273; B65B 1/12; B65B 39/00
See application file for complete search history.

(56) References Cited

U.S. PATENT DOCUMENTS

| | | | | |
|---|---|---|---|---|
| 2,003,628 A | * | 6/1935 | Chadwick | E01C 19/203 239/657 |
| 3,072,290 A | * | 1/1963 | De Biasi | E01C 19/202 222/23 |
| 3,552,346 A | * | 1/1971 | Garden | B65B 1/08 141/72 |
| 3,583,645 A | * | 6/1971 | Murray | E01C 19/20 239/657 |
| 3,602,402 A | * | 8/1971 | Garden | B65B 1/08 222/196 |
| 4,585,041 A | * | 4/1986 | Cavanagh | B65B 39/005 141/231 |
| 5,215,127 A | * | 6/1993 | Bergeron | B65G 47/72 141/10 |

(Continued)

FOREIGN PATENT DOCUMENTS

| | | | | | |
|---|---|---|---|---|---|
| CN | 106628373 A | * | 5/2017 | ............. | B65B 39/00 |
| WO | WO-0027704 A1 | * | 5/2000 | ............. | B65B 39/00 |

*Primary Examiner* — James Keenan
(74) *Attorney, Agent, or Firm* — Jerold I. Schneider; Schneider IP Law

(57) ABSTRACT

A self-driven modular sandbagging device applicable to a dump-truck with a truck bed that defines a sand carrying volume, comprising: a replacing tailgate for the truck bed, capable of replacing the original regular tailgate of the dump-truck, at the lower inner end of the replacing tailgate an integral elongated housing is included, in free contact with the carrying volume of the truck bed, in the integral elongated housing an auger is rotatably installed; the auger is driven by a hydraulic motor located inside the housing, a hydraulic pump connected to the hydraulic motor is attached to the external side of the replacing tailgate, at one end of the housing a bag-filler nozzle is included.

9 Claims, 5 Drawing Sheets

(56) References Cited

U.S. PATENT DOCUMENTS

| | | | | |
|---|---|---|---|---|
| 5,649,666 A * | 7/1997 | Lewis | ........................ | B60P 1/42 |
| | | | | 239/657 |
| 5,755,387 A * | 5/1998 | Hedrick | ................ | A01C 15/007 |
| | | | | 239/657 |
| 5,947,347 A * | 9/1999 | Cline, Sr. | ................... | B60P 1/42 |
| | | | | 222/627 |
| 5,988,534 A * | 11/1999 | Kost | ..................... | E01C 19/203 |
| | | | | 239/650 |
| 6,382,535 B1 * | 5/2002 | Kime | ................... | E01H 10/007 |
| | | | | 239/651 |
| 7,510,365 B2 * | 3/2009 | Babiarz | ................... | E02F 3/407 |
| | | | | 414/725 |
| 8,028,938 B2 * | 10/2011 | Truan | ................... | A01C 17/001 |
| | | | | 239/675 |
| 8,100,301 B2 * | 1/2012 | Babiarz | ..................... | B65B 1/12 |
| | | | | 222/196 |
| 9,499,949 B2 * | 11/2016 | Kline | .................. | E01C 19/005 |

* cited by examiner

SELF-DRIVEN MODULAR SANDBAGGING DEVICE AND METHOD

FIELD OF THE INVENTION

The present invention relates to an apparatus for packaging bulk materials into a container. More particularly, the present invention relates to a device for bagging sand carried by truck, a trailer, or the like. Even more particularly, the present invention relates to a self-driven modular sandbagging device that may be applicable to any type of sand carrier vehicles, including but not limited to, dump trucks, trailers, and the like.

DESCRIPTION OF THE PRIOR ART

Sand is used in several different applications. For instance, in construction, it is a vital element for making concrete. There are other applications in which it is especially important to provide sand in bags. For example, in those areas affected by hurricanes, every time a hurricane approaches the shores people to protect their homes from flooding by placing bags of sand in front of the house's entrances. In several cities around the US, this sand-supplying service is provided by local authorities for free. A truck full of sand usually brings a pile of sand to a public place so people may go there and pick up as many bags of sand as necessary to protect their homes.

The problem is that someone needs to manually fill small bags with sand what is a hard and cumbersome task. The main idea of this invention is to provide a device that can be installed to any dump truck or trailer to fill these bags in an easy, fast, and convenient way.

There are several sandbagging solutions in the prior art. For example, a big open static rigid recipient that may be filled with sand from above and is equipped with a hydraulic-driven bi-directional auger and agitator inside to keep the sand flowing. The device comes with four chutes in each of which a bag can be placed. The auger is rotated, and the user places a bag below the delivering opening of the chute until the bag is filled with sand. The main problem with this device is the limited volume of sand the contained can accept, and therefore, the limited number of bags of sand that can be filled from it.

Another solution is described at U.S. Pat. No. 7,510,365 of Babiarz referred to apparatus for attachment to a mobile machine and for filling a container with bulk material particles held in the apparatus comprising: a receptacle, the receptacle having a bottom, a first wall, and a second wall, a first opening in the first wall, a second opening in the second wall, a first auger positioned within the receptacle for moving bulk material particles from a location in the receptacle towards a first location adjacent the first opening, the first auger mounted in operative relation to the first opening to cause the bulk material particles to exit the receptacle through the first opening, and a second auger positioned within the receptacle for moving bulk material particles from a location in the receptacle towards a second location adjacent the second opening, the second auger mounted in operative relation to the second opening to cause the bulk material particles to exit the receptacle through the second opening, wherein the first and the second auger are configured to rotate independently of each other. As described, this device is specially designed to be attached to the hitch of a tractor, using the tractor's hydraulic power, and processing a limited amount of sand in each batch. It includes two augers, and it cannot be installed on a truck without affecting the functionality of the vehicle. In fact, when this device is installed to the hitch of a tractor, said hitch cannot be used for any other purpose until the device is taken out.

USPA 2007/0243053 also of Babiarz describes another embodiment of the previously-described idea but including the possibility of having only one auger in the hitch of the tractor.

USPA 2020/0263376 of Fossett et al. describes a spreader comprising a hopper for containing sand, salt or other granular material to be spread upon snow or ice on paved surfaces, the hopper being adapted to be installed in or on a bed of a truck, the hopper having a trough, a shaftless auger positioned in the trough, an auger motor for driving the auger, a spinner positioned at one end of the auger for slinging the granular material upon the snow or ice, a spinner motor for driving the spinner, and at least one keeper supported by the trough and extending over the auger for retaining the auger in place during operation and thereby reducing flexure of the auger and resulting loss of efficiency of material transport by the auger during operation of the spreader. This is a complex and expensive device that cannot be installed on the tailgate of a truck, it is neither modular nor self-contained or self-driven like in the present invention.

U.S. Pat. No. 9,499,949 of Kline describes a sander body attachment that accommodates operation in conjunction with a towed trailer. In order to allow a truck the ability to distribute sand to a roadway, while also having the ability to tow accessories, a uniquely configured sander body is provided. The sander body is uniquely adapted for attachment to the truck tailgate and specifically sized so that it does not interfere with the towing mechanisms of the truck. Further, the sander body is also uniquely configured to have a sand distribution chamber, with a removable rear wall, thus allowing easy access for cleaning and maintenance purposes. This device cannot be used to fill sandbags, it is not self-driven and only distributes sand or salt to a roadway.

Therefore, there is a need in the market for a sandbagger device applicable to dump trucks, trailers, and the like with which sand can be easily bagged in a fast, convenient, and easy way overcoming the difficulties and drawbacks of the devices of the prior art.

SUMMARY OF THE INVENTION

The present invention overcomes the deficiencies and the unsolved problems of the sandbagging devices of the prior art by providing an easy-to-install, modular, self-driven, and practical sandbagging device. In a first exemplary embodiment, the sandbagging device in accordance with the present invention comprises: an auger installed at the lower edge of a double-acting tailgate of the dump truck bed; an engine coupled to one end of the auger and driven by a hydraulic engine attached to the outer face of the said tailgate, a bag-filler nozzle at the other end of the auger; the auger is in free contact with the sand carried by the truck bed. The sand filler device is part of a modular tailgate of the dump truck, that can be installed on any truck by an easy and fast installation operation.

It is the main purpose of the present invention to provide a self-driven modular sandbagging device with all the operative elements attached to the body of a tailgate of a dump truck. The device can be easily installed in a regular dump truck, by replacing the original tailgate of the truck with the present device.

It is also a purpose of the present invention to provide a sandbagging device that includes a hydraulic motor driven by a pump attached to the outer face of the tailgate independent from the power circuit of the truck.

It is also a purpose of the present invention to provide a sandbagging device wherein the pump is installed on a support that swings around an axis attached to the outer side of the tailgate.

It is also a purpose of the present invention to provide a sandbagging device including an auger rotatably attached to an auger housing that is an integral part of the lower inner edge of the tailgate.

It is also a purpose of the present invention to provide a sandbagging device in which the hydraulic motor that drives the auger is located inside the auger housing.

It is another purpose of the present invention to provide a sandbagging device including at one end of the auger housing a sandbag-filler nozzle.

In summary, the present invention is referred to as a self-driven modular sandbagging device applicable to a dump-truck with a truck bed that defines a sand carrying volume, comprising:

a replacing tailgate for the truck bed, capable of replacing the original regular tailgate of the dump truck,
    at the lower inner end of the replacing tailgate, an integral elongated housing is included, in free contact with the carrying volume of the truck bed,
    in the integral elongated housing an auger is rotatably installed;
    the auger is driven by a hydraulic motor located inside the housing,
    a hydraulic pump connected to the hydraulic motor is attached to the external side of the replacing tailgate,
    at one end of the housing, a bag-filler nozzle is included.

The present invention is also referred to a method for converting a regular dump truck into a sandbagging dump truck, including the steps of:

stripping down the original regular tailgate from the hinges of the truck bed of a dump truck,
    installing on the same hinges a replacing tailgate including at the lower inner end an integral elongated housing in free contact with the carrying volume of the truck bed, in the integral elongated housing an auger is rotatably installed, driven by a hydraulic motor located inside the housing, a hydraulic pump connected to the hydraulic motor is attached to the external side of the replacing tailgate, and at one end of the housing a bag-filler nozzle is included.

These and other aspects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, in which.

Like reference numerals refer to like parts throughout the several views of the drawings.

DETAILED DESCRIPTION OF REPRESENTATIVE EMBODIMENTS

Figure 1:
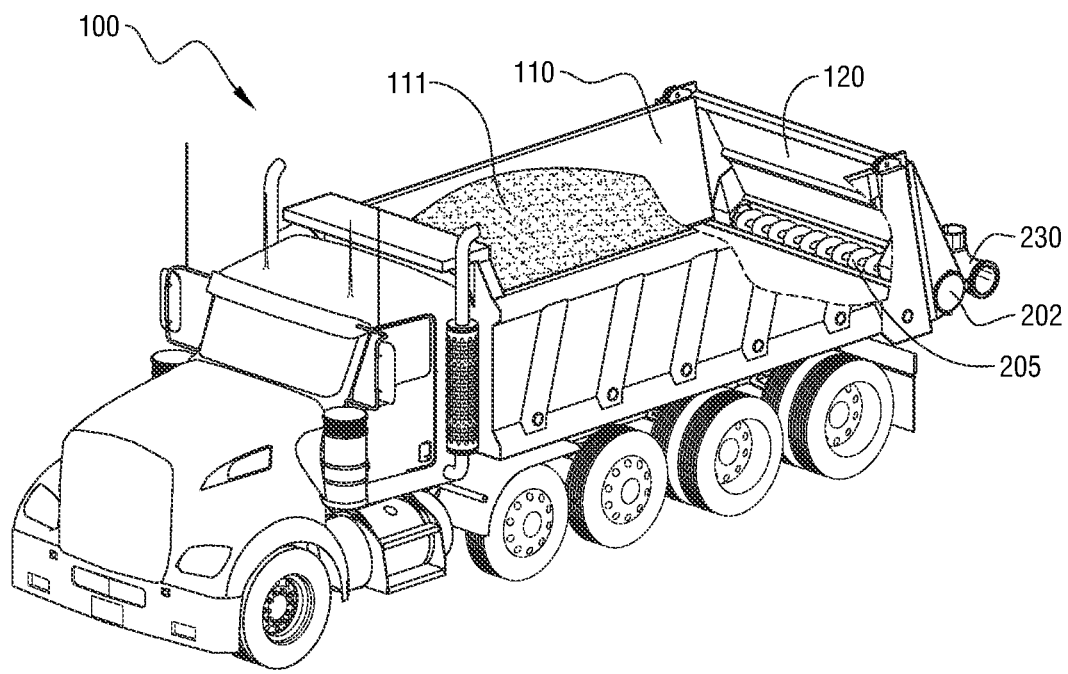
FIG. 1 is a general perspective view of the dump truck including the sandbagging device in accordance with the present invention.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices illustrated in the attached drawings, and described in the following specification, are simply exemplary embodiments of the inventive concepts defined in the appended claim. Hence, specific dimensions and other physical characteristics relating to the embodiments disclosed herein are not to be considered as limiting, unless the claims expressly state otherwise.

A dump truck 100, as shown in FIGS. 1 through 4, includes a truck bed 110 (that defines a carrying volume 111) and a tailgate 120. The dump truck includes, as usual, a hydraulic device capable of rotating the truck bed around a fulcrum. None of these means are illustrated as they are not part of the present invention.

The main purpose of this invention is to create a system for converting a regular dump truck into a sandbagging truck without affecting the original features of the truck. In order to do so, the only operation required is to replace the original tailgate by the replacing tailgate that defines the sandbagging device 200 in accordance with the present invention. Tailgates are attached to the structure of the truck bed through different attaching means not illustrated in the attached drawings as they do not form part of the invention. In order to proceed with the conversion of the truck, the original tailgate is replaced by the device 200 and saved. When the truck needs to return to its original functionality, the original tailgate is re-installed with a simple operation that usually takes some hours. The rest of the features of the truck are not affected or modified in any way.

Figure 2:
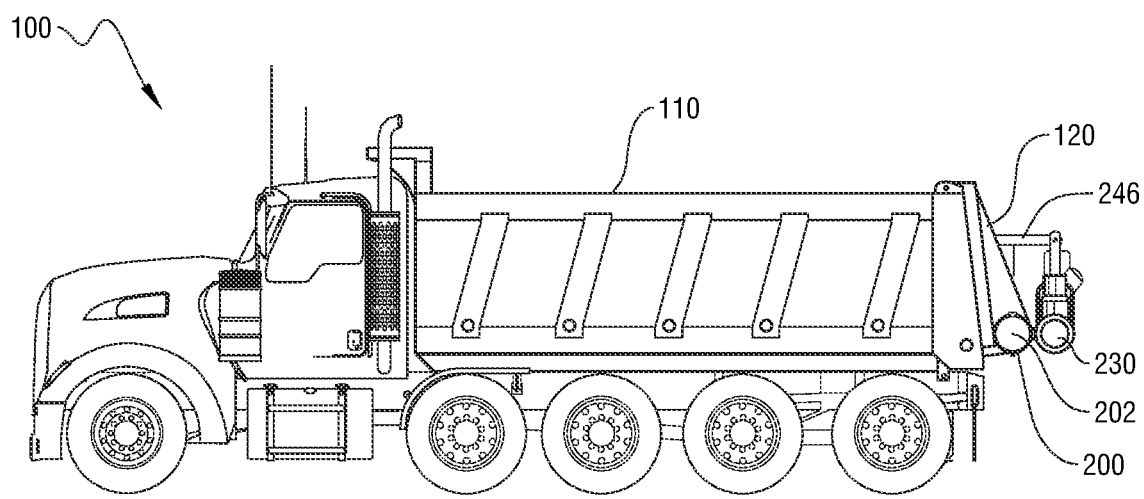
FIG. 2 is a side elevational view of an exemplary dump truck including the sandbagging device in accordance installed to the outer face of the tailgate of the truck bed.
Figure 3:
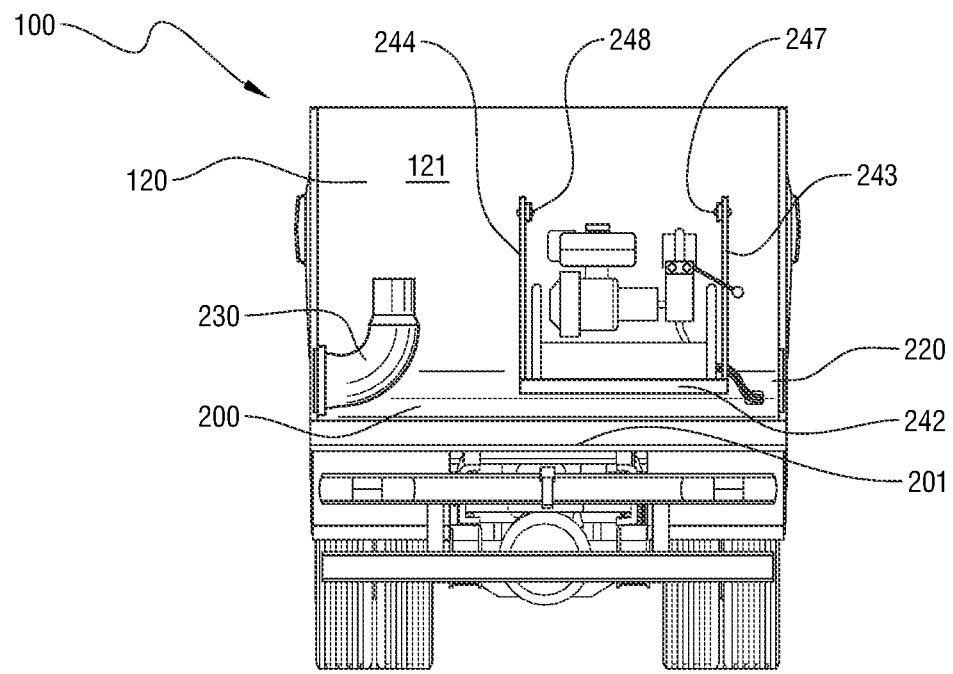
FIG. 3 is a front elevational view of the tailgate including the sandbagging device in accordance with the present invention, in a passive position.
Figure 4:
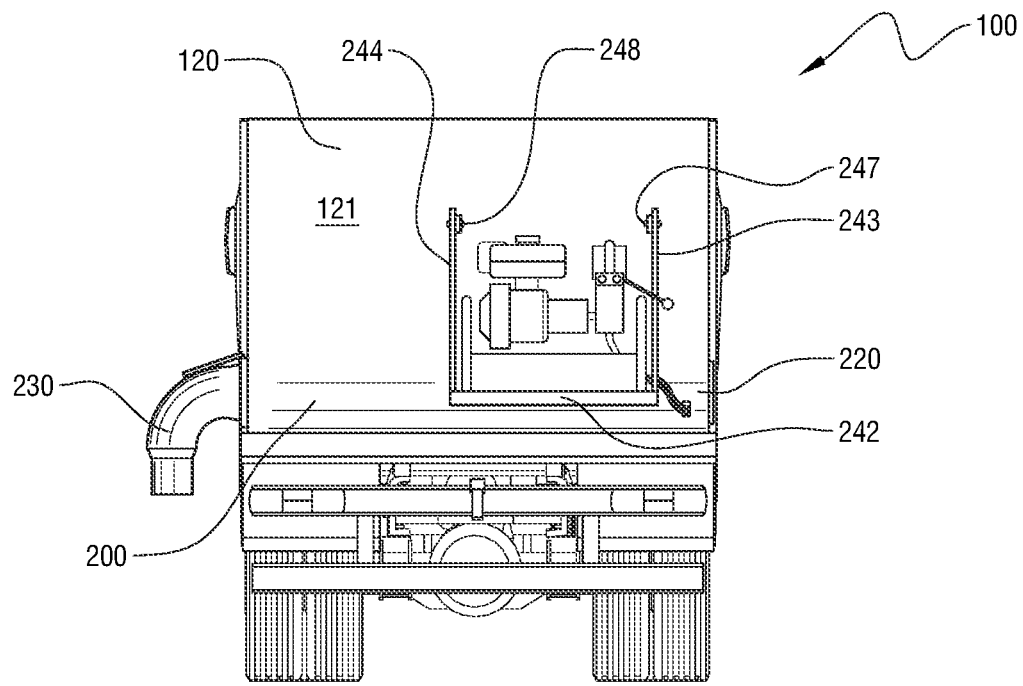
FIG. 4 is similar to FIG. 3 but the sandbagging device is in an active position.
Figure 5:
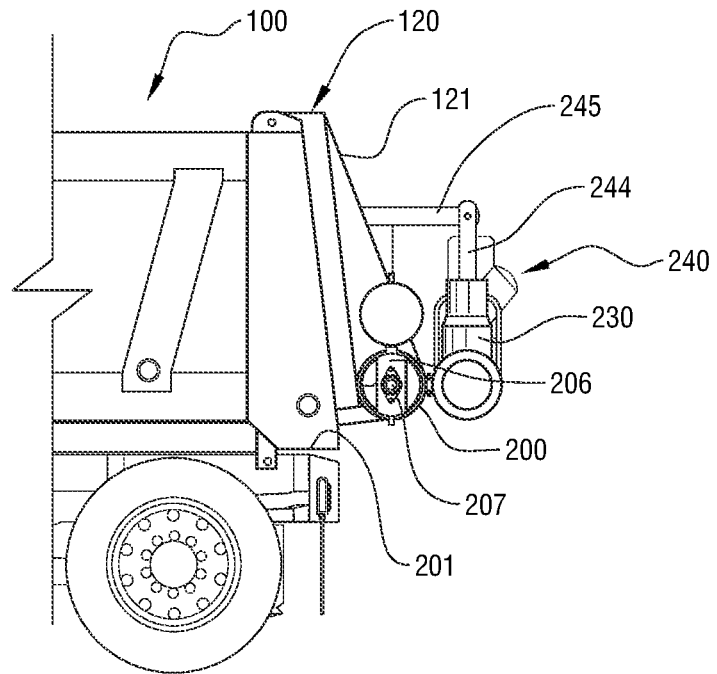
FIG. 5 is an elevation view showing in detail the sandbagging device with the sand-filler nozzle in an open position.

As it is clearly seen in FIGS. 1-2, the original tailgate of the dump truck 100 has already been replaced by the sandbagging device 200 of the present invention. Thus, the sandbagging device 200 works as a regular tailgate but includes as an integral part thereof the features described below.

This replacement operation is especially easy because the replacing tailgate of the present invention is fully autonomous and does not need any of the truck features, including pneumatic or hydraulic power, electric power, or the like.

The self-driven modular sandbagging device 200 comprises a replacing tailgate 200 for the truck bed 110, capable of replacing the original regular tailgate of the dump-truck 100. At the lower inner end 201 of the replacing tailgate 200 an integral elongated housing 202 is included, in free contact with the carrying volume 111 of the truck bed 110. In this particular case, the carrying volume 111 carries sand, and the housing will be full of sand as will be explained below.

In the integral elongated housing 202, an auger 205 is rotatably installed. Axis 207 of the auger 205 is rotatably mounted on respective supports 206 located inside the housing 202.

Said auger is driven by a hydraulic motor 220 located inside the housing 202. When the sandbagging device 200 is not operating, a lid 208 covers one of the openings of said housing 202, and a lid 209 covers the opposite end where the hydraulic motor 220 is located.

Said hydraulic motor 220 is in turn driven by a hydraulic pump 240. Said pump 240 is linked to the replacing tailgate 120 by pump support 241 comprising a base 242 to which two parallel rigid arms 243-244 are attached. Said arms 243-244 are hinged to respective transversal arms 245-246 through respective fulcrums 247-248. Said arms 245-246 are in turn welded to the outer side 121 of the replacing tailgate 120. Thus, the pump 240 while resting on the base 242 is always at a straight vertical position. When the dump truck 100 inclines the truck bed 110 and thus the arms 245-246 welded to the outer side of the tailgate 120, the base 242 rotates around the fulcrums 247-248 by gravity to keep the pump 240 in a vertical position. This is important to keep the normal feeding of gas to the internal combustion engine of the pump 240.

Figure 6:
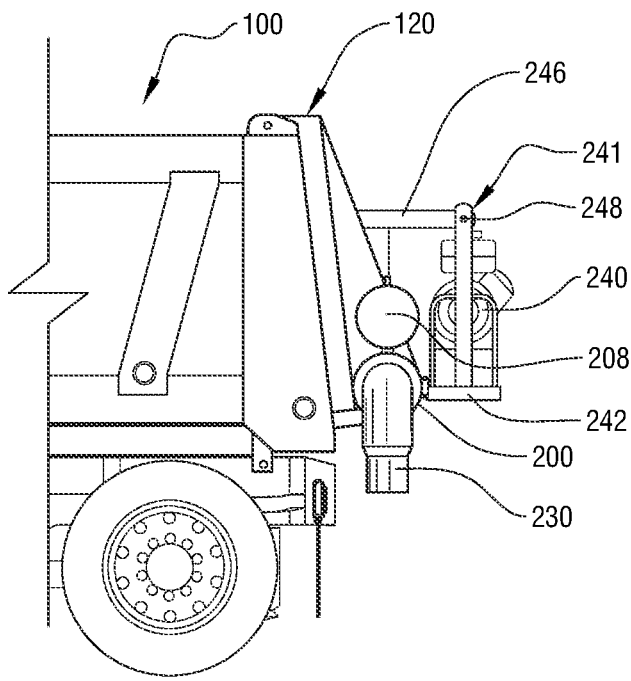
FIG. 6 is similar to FIG. 5 with the sand-filler nozzle in an operative position, ready to fill bags with the sand contained in the truck.
Figure 7:
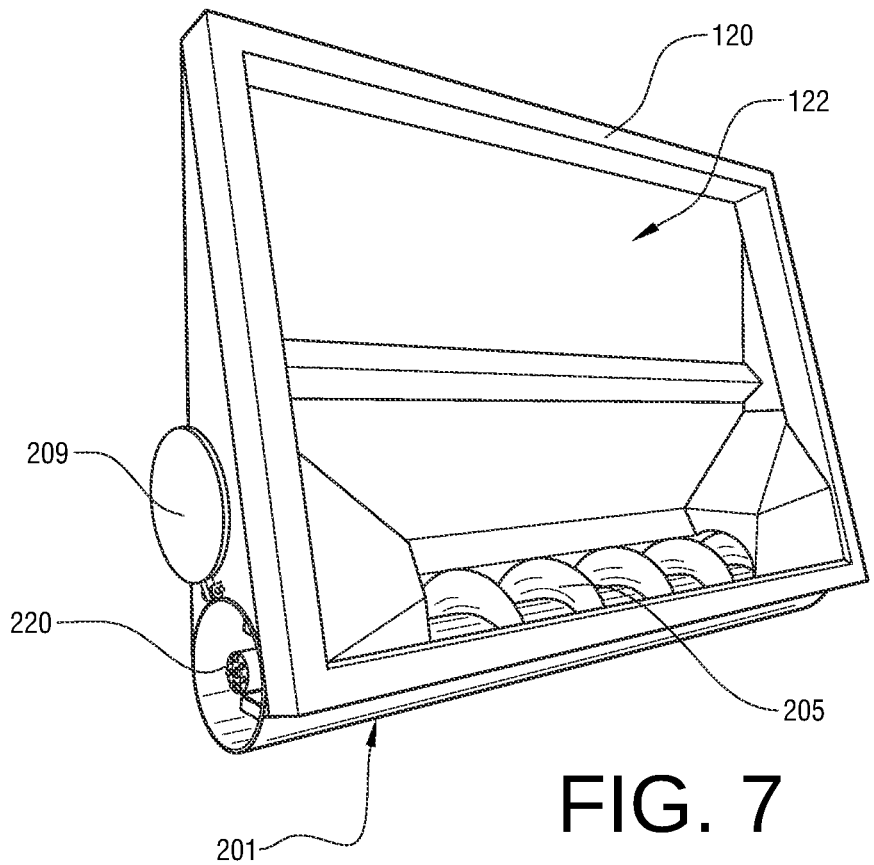
FIG. 7 is a general perspective view of the sandbagging device showing the inner face of the tailgate, the auger housing, the auger, and the hydraulic motor in it.
Figure 8:
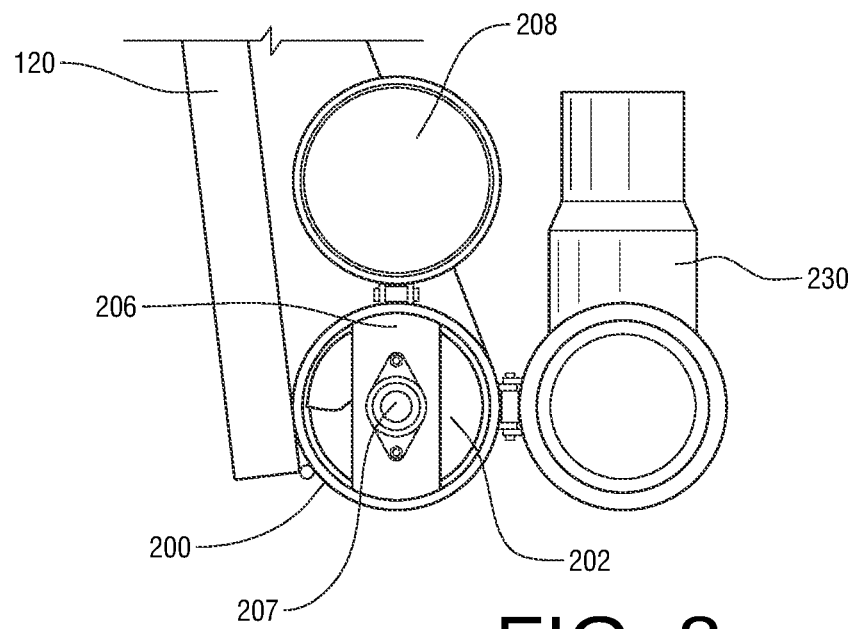
FIG. 8 is an elevational view showing in detail the sand-filler nozzle, and the support on which the axis of the auger is mounted.
Figure 9:
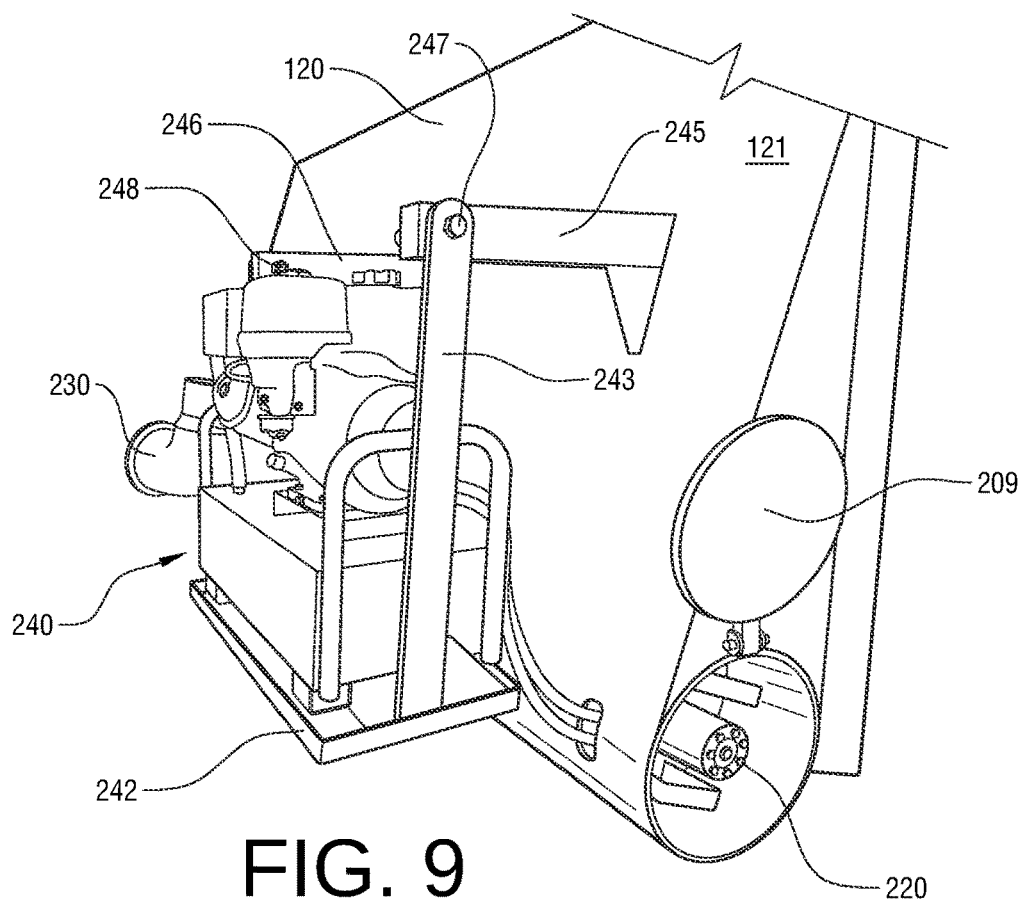
FIG. 9 is another perspective view of the sandbagging device showing the support on which the hydraulic pump is mounted, the hydraulic motor that drives the auger, and the lid that covers one end of the auger housing, finally.
Figure 10:
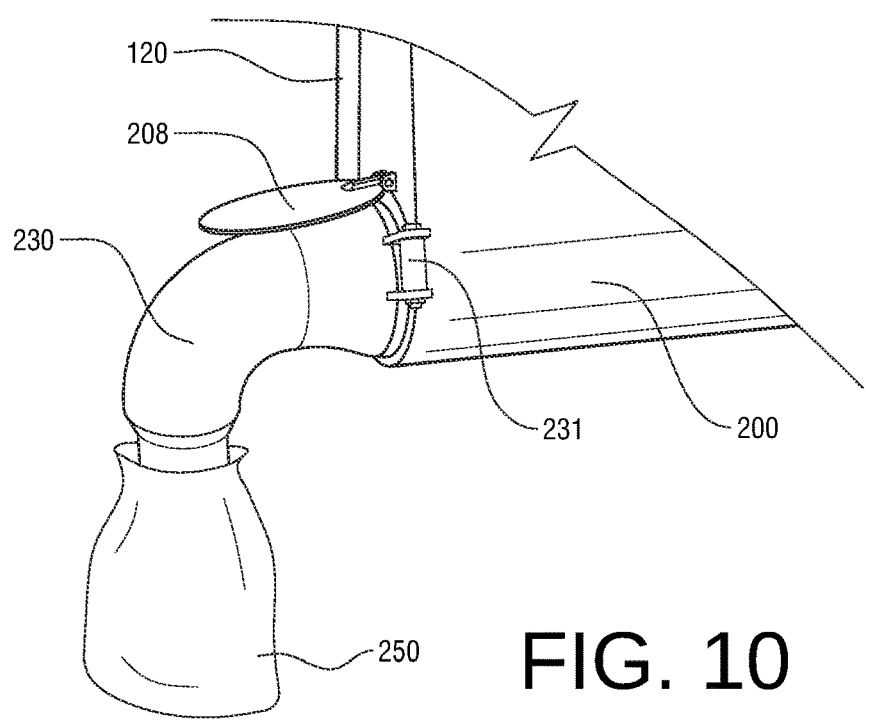
FIG. 10 is another perspective view showing a bag being filled by the sandbagging device of the present invention.

At the end of said housing 202, a bag-filler nozzle is hinged to the outer side 121 of the replacing tailgate 120 through a hinge 231. Said hinge allows the nozzle to rotate from the passive position shown in FIGS. 1-3 to the operative position shown in FIGS. 4, 6, and 10. Once the nozzle 230 is in its operative position covering the exit of the housing 202, it is then rotated 180° over its axis and coupled to said exit (see FIGS. 4 and 10).

When the truck arrives at the place in which the sand will be supplied, with the carrying volume 111 full of sand, the lid 208 is open, the nozzle 230 is rotated and coupled to the exit of the housing 202, the nozzle 230 is then rotated over its axis to the operative position and a bag 250 is placed at the end of the nozzle 230 and the pump 240 and engine 220 are turned on. The auger will then start rotating carrying the sand from the carrying volume 111 into the nozzle 230 and thus into the bags 250. Once the operation is over, the pump 240 and the motor 220 are turned off, the nozzle 230 is rotated up and hinged, and the truck is now ready to go to another place to provide bagged sand.

The present invention is also referred to a method for converting a regular dump truck into a sandbagging dump truck, including the steps of:

stripping down the original regular tailgate from the hinges (not illustrated) of the truck bed 110 of a dump truck 100, installing on the same hinges a replacing tailgate 200 including at the lower inner end an integral elongated housing 202 in free contact with the carrying volume 111 of the truck bed 110, in the integral elongated housing 202 an auger 205 is rotatably installed, driven by a hydraulic motor 220 located inside the housing 202, a hydraulic pump 240 connected to the hydraulic motor 220 is attached to the external side of the replacing tailgate 200, and at one end of the housing, a bag-filler nozzle 230 is included.

While the preferred embodiments of the invention have been described above, it will be recognized and understood that various modifications can be made in the invention and the appended claims are intended to cover all such modifications which may fall within the spirit and scope of the invention.

REFERENCE ELEMENT LIST

Ref. No. Description
100 dump truck
110 truck bed
111 carrying volume
120 tailgate
200 sandbagging device
201 lower inner end of the replacing tailgate 200
202 integral elongated housing
205 auger
207 axis of the auger 205
206 supports
208 lid
209 lid
220 hydraulic motor
230 bag-filler nozzle
231 hinge
240 hydraulic pump
241 pump support
242 base
243 parallel rigid arms
244 parallel rigid arms
245 transversal arms
246 transversal arms
247 fulcrum
248 fulcrum
250 bag

What is claimed is:

1. A self-driven modular sandbagging device applicable to a dump truck that includes a pivotable tailgate and a truck bed that defines a sand carrying volume, comprising:
   a self-contained pivotable tailgate, capable of replacing the pivotable tailgate of the dump truck,
   the self-contained pivotable tailgate including:
      an integral elongated housing having first and second sides and extending in a first direction and adapted to be in free contact with the carrying volume of the truck bed,
   the self-contained pivotable tailgate further including:
   an auger rotatably installed in said housing, and a hydraulic motor located inside the housing for rotating said auger about a first axis for dispensing sand from said sand carrying volume through an opening in said first side of said housing;

a hydraulic pump connected to the hydraulic motor and attached to the self-contained pivotable tailgate, and a bag-filler nozzle;

said bag-filler nozzle being rotatable between first and second positions; and said bag-filler nozzle being rotatable between said first position and a third position;

said bag-filler nozzle being operatively connected to receive sand dispensed by said auger through said opening when said bag-filler nozzle is in said third position.

2. The self-driven modular sandbagging device of claim 1, wherein the integral elongated housing has a cylindrical shape.

3. The self-driven modular sandbagging device of claim 1, wherein the integral elongated housing includes at least two supports on which the auger is rotatably mounted.

4. The self-driven modular sandbagging device of claim 1, wherein the hydraulic motor and the bag-filler nozzle are positioned at opposite sides of said housing.

5. The self-driven modular sandbagging device of claim 1, wherein the hydraulic pump is installed on a pump support linked to said self-contained pivotable tailgate.

6. The self-driven modular sandbagging device of claim 5, wherein the pump support includes a base on which the pump rests, including two arms rotatably mounted on an axis attached to said self-contained pivotable tailgate.

7. The self-driven modular sandbagging device of claim 1, wherein said bag-filler nozzle is rotatable 180° between said first position and said second position.

8. The self-driven modular sandbagging device of claim 1, wherein said bag-filler nozzle is rotatable 180° between said first position and said third position.

9. The self-driven modular sandbagging device of claim 1, and further including a lid for closing said opening when said bag-filler nozzle is in said first position.

* * * * *